July 12, 1932.

F. C. MOCK

AIRPLANE CARBURETOR

Re. 18,520

Original Filed Jan. 16, 1924 2 Sheets-Sheet 1

Witness:

Inventor

Frank C. Mock

By Brown, Boettcher, Dinner

Attys.

July 12, 1932.

F. C. MOCK

AIRPLANE CARBURETOR

Re. 18,520

Original Filed Jan. 16, 1924 2 Sheets-Sheet 2

Witness:
Ed. E. Lorson

Inventor:
Frank C. Mock
By Brown, Boettcher, Dinner
Attys.

Reissued July 12, 1932

Re. 18,520

UNITED STATES PATENT OFFICE

FRANK C. MOCK, OF EAST ORANGE, NEW JERSEY, ASSIGNOR TO BENDIX STROMBERG CARBURETOR COMPANY, OF CHICAGO, ILLINOIS, A CORPORATION OF ILLINOIS

AIRPLANE CARBURETOR

Original application filed January 16, 1924, Serial No. 686,474, Patent No. 1,600,008, dated September 14, 1926. Divided and application filed March 18, 1926, Serial No. 95,516, Patent No. 1,743,791, dated January 14, 1930. Application for reissue filed December 8, 1931. Serial No. 579,810.

My invention relates to carburetors, particularly to airplane carburetors, and it is a division of my co-opending application, Serial No. 686,474, filed January 16, 1924, which has matured into Patent No. 1,600,008, dated September 14, 1926. The object of the invention is to provide improved float and float chamber construction and arrangement.

Figure 1:
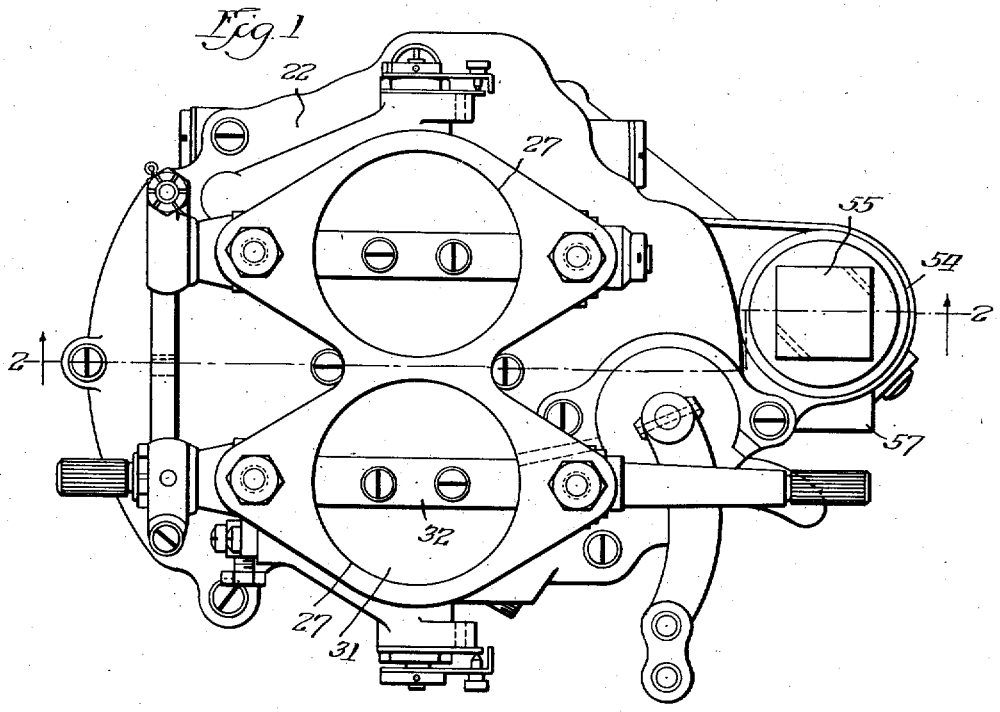
Figure 1 is a plan view of a double barrel form of carburetor.

The structure shown on the drawings comprises a casing 22 constructed of a lower casing section 23 and an upper casing section 24 joining along the split line 25, a gasket 26 being preferably interposed between the casing sections. It will be noted that this split line is above the normal fuel level. Extending up through the lower casing section 23 are the two carburetor barrels 27—27, these barrels being extended up through the upper casing section 24. Mounted in each barrel is a Venturi tube 28, and discharging adjacent the throat of this venturi is a main nozzle 29. A throttle valve 31 mounted on a transverse throttle shaft 32, controls the flow through each barrel. The arrangement of Venturi tube, nozzle, and throttle in one barrel is practically a counterpart of the arrangement in the other.

A float chamber, designated 33 in its entirety, substantially surrounds the two carburetor barrels 27 on the front, back and one side of the barrels. The front and rear areas 34 and 35 of this float chamber are of substantially the same capacity, and are cross connected on the longitudinal axis of the carburetor by a tube 36 (Figure 2) of such cross section as to allow rapid flow of the fuel from one chamber area to the other when the carburetor is inclined on this longitudinal axis. Two substantially drum shaped floats 37 of equal size are supported in the chamber areas 34 and 35 on the arms 38 of a yoke 39. It will be noted that these floats are supported with their axes substantially coincident with the median plane of the curburetor between the two barrels 27.

Figure 3:
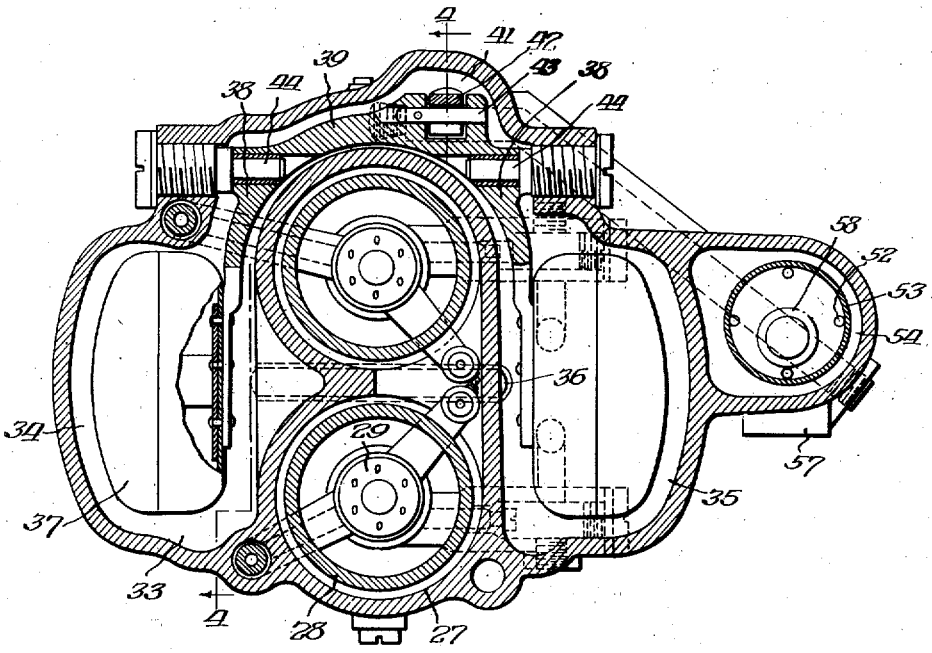
Figure 3 is a horizontal sectional view taken on plane 3—3 of Figure 2.
Figure 4:
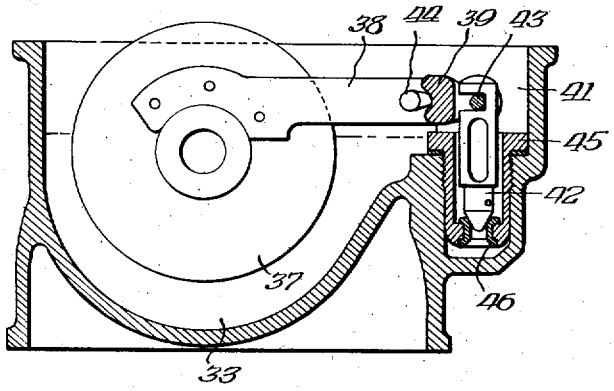
Figure 4 is a fragmentary sectional view taken approximately on the line 4—4 of Figure 3.

The lateral portion 41 of the float chamber extending around the outer side of one of the barrels, receives the float controlled valve 42 which maintains a predetermined level of fuel in the chamber 33. The upper end of the valve 42 is slotted laterally for hooking over a pin 43, which pin is carried in a bifurcated or notched portion of the yoke 39, as shown in Figure 3. Yoke 39 is pivotally supported upon pivot pins 44, having threaded shanks, screwing into the carburetor body at opposite points. As shown in Figure 4, the valve 42 is guided in a tubular plug 45 having a valve seat in its lower end. This valve seat is faced by a hardened metal bushing 46 for engagement with the valve 42, the tubular plug 45 being of aluminum or some other light weight metal.

Figure 2:
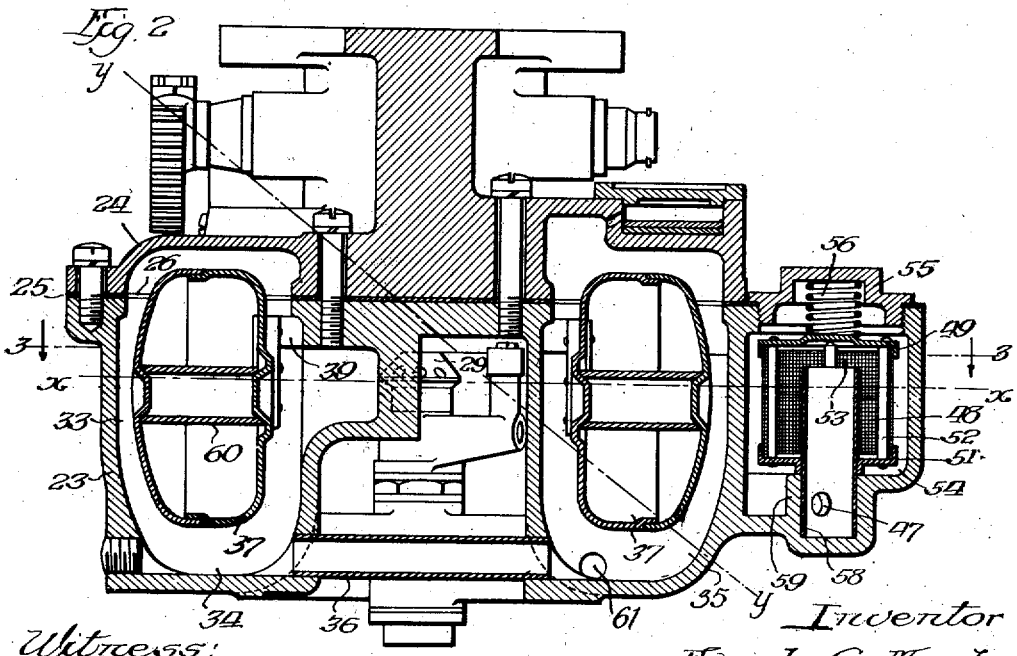
Figure 2 is a transverse sectional view taken on plane 2—2 of Figure 1.

Fuel is supplied to valve seat bushing 47 through a cored passageway 47, which extends diagonally across the rear part of the carburetor casting to a fuel strainer 48, as shown in Figure 3. As shown in Figure 2, the strainer is built up of upper and lower sheet metal caps 49 and 51 connected by a plurality of longitudinal spacing rods 52. A cylindrical screen 53 of fine mesh encircles the cylindrical frame defined by the rods 52 between the end caps 49 and 51. The strainer is supported in a straining chamber 54 cast integral with the lower casing section 23. A threaded cap 55 closes the open top of this straining chamber and compresses a spring 56 down against the top of the straining screen. The fuel is admitted from the supply tank into the straining chamber 54 through a lateral port 57, shown in plan in Figure 1. A tube 58 passes down through the screen 48, eccentrically thereof as shown in Figure 3, and the lower end of this tube is anchored in a tubular boss 59 at the bottom of the straining chamber. The supply passageway 47 opens laterally through the wall of the boss 59 and of the tube 58 for receiving the strained fuel fed down through the upper end of the tube 58. The spring 56 quiets all tendency of the strainer to vibrate or rattle, and by the simple removal of the plug 55 the strainer is instantly accessible for cleaning. Its location at the rear of the carburetor aids in retaining the carburetor of relatively narrow transverse dimension for setting down within the V of aeronautic engines.

It will be observed that I have proportioned the parts so that the normal fuel level indicated on Figure 2 by the dash and dot line X—X will lie slightly higher than the centers of the floats 37—37. This places a relatively large quantity of fuel in the float chamber, so that at relatively large angles of either fore or aft inclination there will be ample fuel to buoy up the float mechanism and to maintain the fuel supply ports 61 leading to the fuel nozzles covered with fuel. It will also be noted that as the fuel shifts from one float chamber area to the other through passage 36 with the fore and aft inclination of the craft, the lesser buoyancy of the float on the high end will be compensated for by the increased buoyancy of the float on the low end, because of the greater submergence of this low float. As before stated, the centers of buoyancy of the floats are in a median plane between the two carburetor barrels, and the chamber areas 34 and 35 are so proportioned on each side of the common axis of these floats that in lateral inclination of the carburetor the fuel level will tend to revolve substantially around the common center of buoyancy of the float. As the result of this there is minimum possibility of either fuel nozzle being starved of fuel during lateral inclination of the air craft.

I can proportion the two floats and their related parts so that the fuel level during fore and aft inclination of the craft will remain at the same normal height relative to the tip of the nozzle as during horizontal flying; but I prefer to actually proportion these parts so that there will be an appreciable rise of level relative to the nozzle when the craft is inclined either forwardly or backwardly. In a typical embodiment I design the parts so that the fuel valve will have a closing pressure of approximately fourteen-twelfths times the buoyancy of one float completely submerged. Consequently, when in the backward or forward inclination of the craft, the fuel rushes to the front or back, submerging one float, this totally submerged float will be incapable alone of holding the fuel valve on its seat. If two-twelfths of the buoyancy of the other float is not supported by fuel in the other part of the float chamber, the fuel valve will open and fuel will enter until this two-twelfths of the float buoyancy is made up. This will raise the level relative to the nozzle outlet. Referring to Figure 2, if the carburetor is tilted with the float chamber section 35 up, fuel will flow through the duct 36 into the chamber section 34 to fill this chamber section, but to leave sufficient fuel in chamber section 35 to keep the nozzle inlet passageway 61 submerged, and until the combined buoyancy of the float is sufficient to close the fuel inlet valve, fuel will enter until the buoyancy is sufficient and the level will then be indicated by the line *y—y*, well above the top of the fuel nozzle to insure adequate fuel supply to the carburetting chamber. Any proportion of floats and valves may be utilized to raise the fuel level a greater or lesser height.

The floats are internally braced by tubular bracing struts 60 extending across the same centrally. Without such braces these floats have collapsed in service, due probably to back-fire pressures.

Having described my invention, I claim as follows:

1. A carburetor comprising two vertical carburetor barrels, a float chamber, and a float therein comprising rigidly united float portions disposed forward and back of the plane of said two barrels.

2. In a carburetor, the combination of two vertical carburetor barrels disposed side by side, a float chamber comprising a front chamber extending across the front of said two barrels, and a rear chamber extending across the rear of said barrels, and float mechanism comprising float portions in both of said chambers.

3. In a carburetor, the combination of a pair of vertical carburetor barrels arranged in a plane, a constant level chamber extending around on opposite sides of the plane of said barrels, and float mechanism in said chamber having rigidly united float portions disposed on opposite sides of the plane of said barrels.

4. In a carburetor, the combination of a pair of vertical carburetor barrels disposed side by side, a constant level chamber comprising a front chamber on the front side of said barrels and a rear chamber on the rear side of said barrels, a fuel controlling valve, yoke shaped means for actuating said valve, and a float on each arm of said yoke shaped means and disposed in each of said chambers.

5. In a carburetor, the combination of a pair of vertical carburetor barrels disposed side by side, a float chamber comprising front and rear chambers on the front and rear sides of said carburetor barrels, a valve controlling the admission of fuel to said float chamber, a yoke pivotally supported in said chamber and operatively connected to said valve, the arms of said yoke straddling said carburetor barrels and extending into said front and rear chambers, and a separate float on each of said yoke arms.

6. In a carburetor, the combination of two carburetor barrels in a common plane, a fuel nozzle in each of said carburetor barrels, a float chamber having front and rear chambers extending around on the front and rear sides of the plane of said barrels, a control valve in said chamber, a yoke for actuating said valve, the arms of said yoke extending into each of said front and rear chambers, floats on each of said yoke arms, the centers of buoyancy of said floats lying substantially in a line extending centrally between said carburetor barrels, and a transverse channel connecting the lower parts of said front and rear chambers.

7. A carburetor comprising a plurality of carburetor barrels, a fuel chamber embracing the barrels, and substantially cylindrical compartments in the fuel chamber having their axes coincident and in the median plane between the barrels.

8. A carburetor comprising a plurality of carburetor barrels and a fuel chamber associated therewith having substantially cylindrical compartments, the axes of which are positioned in a plane at right angles to a plane including the barrel axes.

9. A carburetor comprising a plurality of carburetor barrels, a fuel chamber embracing the barrels having substantially cylindrical compartments on opposite sides of the barrels having their axes in a plane passing between the barrels.

10. A carburetor comprising a plurality of vertical carburetor barrels, a fuel chamber embracing the barrels, having substantially cylindrical compartments on opposite sides of the barrels having their axes coincident.

11. A carburetor comprising a plurality of vertical carburetor barrels, a float chamber embracing the barrels and a plurality of substantially cylindrical compartments in the float chamber having their axes coincident and in a vertical plane between the barrels.

12. A carburetor comprising two vertical carburetor barrels and a fuel chamber embracing the barrels having substantially cylindrical compartments therein, the axes of which are coincident and positioned in a vertical plane equidistant from the barrels.

In witness whereof, I hereunto subscribe my name this 5th day of December, A. D., 1931.

FRANK C. MOCK.